United States Patent

O'Neill, Jr. et al.

Patent Number: 6,141,570
Date of Patent: Oct. 31, 2000

[54] SYSTEM AND METHOD FOR CONSERVING BATTERY ENERGY IN A WIRELESS TELEPHONE WITH AN INTEGRAL GLOBAL POSITIONING SYSTEM

[75] Inventors: Gregory A. O'Neill, Jr., Apex; Edward V. Jolley, Durham; Torbjorn W. Solve, Cary, all of N.C.

[73] Assignee: Ericsson Inc., Research Triangle Park, N.C.

[21] Appl. No.: 09/140,596

[22] Filed: Aug. 26, 1998

[51] Int. Cl.[7] .................................................. H04B 1/38
[52] U.S. Cl. ........................................... 455/574; 455/343
[58] Field of Search ..................................... 455/574, 575, 455/90, 343, 12.1; 342/357.09, 357.01, 357.07

[56] References Cited

U.S. PATENT DOCUMENTS

| | | | |
|---|---|---|---|
| 5,119,504 | 6/1992 | Durboraw, III . | |
| 5,301,368 | 4/1994 | Hirata | 455/78 |
| 5,365,450 | 11/1994 | Schuchman et al. . | |
| 5,448,773 | 9/1995 | McBurney et al. | 455/343 |
| 5,592,173 | 1/1997 | Lau et al. | 342/357 |
| 5,650,785 | 7/1997 | Rodal | 342/357 |
| 5,663,735 | 9/1997 | Eshenbach | 342/357 |
| 6,064,336 | 5/2000 | Krasner | 342/357.09 |
| 6,067,045 | 5/2000 | Castelloe et al. | 342/357.01 |

FOREIGN PATENT DOCUMENTS

WO 98/09181  3/1998  WIPO .

OTHER PUBLICATIONS

Article entitled "SiRFstarI/LX Low Power GPS Archltecture," SiRF Technology, Inc., authors Turetzky et al., undated.

Primary Examiner—Nguyen Vo
Assistant Examiner—Marsha D. Banks-Harold
Attorney, Agent, or Firm—Wood, Phillips, VanSanten, Clark & Mortimer

[57] ABSTRACT

A wireless telephone having a wireless communication transceiver, a global positioning system (GPS) receiver, and a controller connected to both the wireless communication transceiver and the GPS receiver, wherein the controller intelligently adapts its GPS data maintenance schedule according to a unique set of indicators derived from the wireless telephone's operating conditions.

24 Claims, 4 Drawing Sheets

6,141,570

SYSTEM AND METHOD FOR CONSERVING BATTERY ENERGY IN A WIRELESS TELEPHONE WITH AN INTEGRAL GLOBAL POSITIONING SYSTEM

FIELD OF THE INVENTION

This invention relates to the field of wireless telephones that include an integrated global positioning system unit, and, more specifically, to a system that conserves the wireless telephone's battery energy while properly maintaining the global positioning system's (GPS) short term and long term operating information.

BACKGROUND OF THE INVENTION

A wireless telephone is only useful for as long as its battery can provide power. Thus, power efficiency is a dominant factor in determining the overall quality and utility of any wireless communications product. As a result, many innovations have been achieved in the areas of battery technology and intelligent power consumption.

A relatively new innovation, however, adds significant demands upon the battery of a wireless telephone. Namely, the incorporation of a GPS unit into a wireless telephone delivers powerful capabilities to system operators as well as advanced features to end users. Specifically, system operators can employ GPS to facilitate call setup, call routing, billing, and tracking of the telephones. Furthermore, end users are provided with pinpoint navigation services, emergency location services and many other desirable features.

In order to provide such positioning services on demand, a GPS receiver must establish and maintain a heightened state of readiness to support the rapid acquisition and tracking of a plurality of GPS satellites. Ranging measurements derived from tracking these satellites fuel the computation of accurate estimates of position, velocity, and time (PVT).

Following an initial location determination, a GPS receiver maintains this state of readiness by periodically refreshing critical operational data. These data can be divided simply into short-term and long-term GPS information. Short-term GPS data includes the receiver's current estimates of GPS position, velocity, and time, and a running list of visible satellites. Such information is updated by periodically acquiring/reacquiring satellites and computing PVT fixes. These update intervals may range from several seconds to some number of minutes, depending upon the technology employed in the GPS receiver.

Long-term GPS information includes the ephermeris and almanac information broadcast in the navigation messages of the GPS satellites. For a given satellite, the ephermeris data includes highly accurate modeling parameters that describe the orbital path and atomic clock drift of that particular satellite. Ephermeris parameters are updated about every two hours for each visible satellite in order to support accurate PVT computations. The almanac data contains less accurate modeling parameters for the entire GPS constellation. Almanac information is critical to the receiver's startup sequence and in predicting the rise of satellites into the receiver's visible region. Depending upon the implementation, almanac data may only require an update every several days.

As stated above, both short-term and long-term GPS information must be properly refreshed and maintained in order to prepare a receiver to produce prompt and accurate PVT fixes upon system or user demand. With readiness such a critical concern, an elementary approach would be to mechanize the receiver to continuously track GPS satellites and update these data at some very high rate. However, each acquisition, each tracking operation and each demodulation of the navigation data requires an expenditure from the wireless telephone's precious energy reserves.

In a effort to preserve battery energy, it is common practice to operate a GPS receiver in a stand-by mode of readiness wherein the receiver expends energy according to some fixed predetermined schedule of short-term and long-term GPS data maintenance. In addition to adhering to rigid update schedules, some receivers are persistent in their pursuit of scheduled refresh actions. Thus, energy may be repeatedly expended until an attempted update action is successfully accomplished.

When integrated into a wireless telephone, however, such rigid and relentless GPS data refresh schemes drain significant amounts of energy from the terminal's battery. In fact, without careful thought and innovation, the energy expended by the GPS receiver is likely to exceed by several-fold that expended by the baseline telephone alone.

SUMMARY OF THE INVENTION

A wireless telephone in accordance with our invention comprises a wireless communication transceiver for establishing and maintaining communication, a global positioning system (GPS) receiver configured to acquire short term and long term GPS information, and a controller device connected to both the communication transceiver and the GPS receiver, wherein the controller is configured to cause the GPS receiver to acquire the various short-term and long-term data according to some sensible time-driven schedule. The controller is further mechanized to intelligently adapt its GPS data maintenance schedule according to a unique set of indicators derived from the wireless telephone's operating conditions.

These indicators are continuously monitored by the wireless telephone's controller unit in an effort to discern periods advantageous to GPS signal reception from periods disadvantageous to GPS signal reception. Power is conserved by delaying, canceling or aborting GPS information updates during the periods which are unlikely to support satisfactory GPS signal reception. Conversely, GPS-related power expenditures are targeted for the periods more likely to support successful GPS signal reception. Additionally, these indicators can be used to judge the necessity of GPS information update actions. Depending upon these judgements, the update intervals of various maintenance actions can be expanded in order to preserve the telephone's energy reserves.

Indicators that affect the maintenance schedule for short-term information include, but are not limited to, a received signal strength indication (RSSI) level associated with a communication channel, the rate of change of this RSSI level and the direction of change of this RSSI level. Additional indicators that affect the maintenance schedule for short-term data include receipt of a paging message, general keypad manipulation, and rate of motion exhibited by the wireless telephone.

Indicators that affect the maintenance schedule for long-term GPS information include the RSSI level associated with a communication channel and the rate/direction of change of this RSSI level.

BRIEF DESCRIPTION OF THE DRAWINGS

A more complete understanding of this invention may be obtained from a consideration of the following detailed description in conjunction with the drawings, in which.

DETAILED DESCRIPTION

Figure 1:
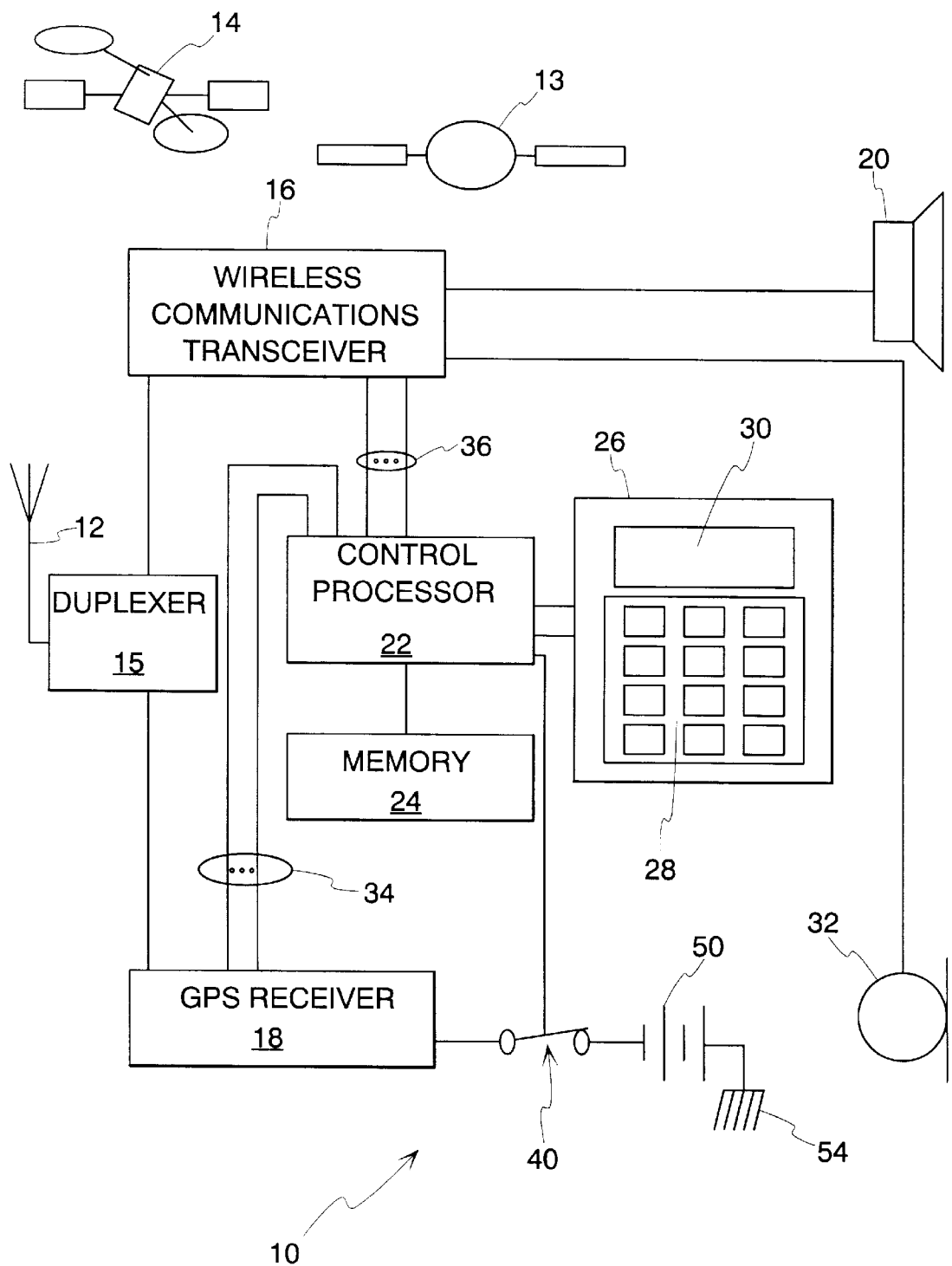
FIG. 1 is a block diagram of a satellite telephone system employing an exemplary embodiment of this invention.

FIG. 1 is a block diagram of a wireless telephone according to an exemplary embodiment of this invention, shown generally at 10. This exemplary embodiment of this invention is described in the context of a satellite telephone, but it will be apparent to those skilled in the art that this invention may easily be adapted to terrestrial wireless telephony with little or no modification. Wireless telephone 10 includes an antenna 12 for sending and receiving radio signals between itself and a network of communication satellites 14. The antenna 12 is also used to receive radio signals transmitted from a plurality of global positioning system (GPS) satellites 13. The antenna 12 is connected to a duplex filter 15, or other known device that enables the wireless communication transceiver 16 and the GPS receiver 18 to receive, and the wireless communication transceiver 16 to broadcast on the same antenna 12, or another included antenna. Wireless communication transceiver 16 receives and processes signals from the communications satellites and delivers communications content to a speaker 20 (or other output device, such as a modem or fax connector) and controls messages to a control processor (controller) 22.

The control processor 22 controls and coordinates the functioning of wireless telephone 10 responsive to control messages using programs and data stored in memory 24, so that wireless telephone 10 can operate within the satellite network. Controller 22 also controls the operation of wireless telephone 10 responsive to input from user interface 26. User interface 26 includes a keypad 28 as a user-input device and a display 30 to give the user information. Other devices may be included in user interface 26, such as lights and special purpose buttons. Controller 22 controls the operations of wireless communication transceiver 16 and GPS receiver 18 over control lines 34 and 36, respectively, responsive to control messages and user input.

Microphone 32 (or data input device) receives speech input, converts the input into analog electrical signals and delivers the analog electrical signals to communication transceiver 16. Wireless communication transceiver 16 converts the analog electrical signals into digital data, encodes the data with error detection and correction information and multiplexes this data with control messages from controller 22. Wireless communication transceiver 16 then modulates this combined data stream and broadcasts the resultant radio signals to the satellite communications network through duplex filter 15 and antenna 12.

GPS receiver 18 receives signals from a plurality of GPS satellites 13, and provides short term and long term data to the controller 22, which calculates a position of the unit relative to these signals, as is known in the art. Further, the short term and long term data must be periodically updated in order to prepare the receiver for the calculation of prompt and accurate PVT fixes. Thus, a sensible set of GPS standby operations is incorporated into the existing standby strategy of the wireless telephone 10. These additional standby operations are required to properly maintain the GPS receiver's short-term and long-term information update schedule.

GPS receiver 18 is connected via switch 40 to battery 50. Switch 40 is controlled by control processor 22 and is normally open. Battery 50 is additionally connected to ground 54. Of course, the other blocks of wireless telephone 10 also have connections to battery 50, but, since these connections are not relevant to this disclosure, they are not shown.

As mentioned previously, typical geo-location applications usually maintain GPS-related information according to some regular, fixed schedule. For many hand-held applications, PVT computations are accomplished every second and ephermeris data is refreshed every one or two hours. Current GPS chip sets have introduced minimal overhead methods of power cycling. Consequently, GPS receivers are generally powered on and off between PVT fixes to save power.

According to our invention, wireless communication transceiver 16, GPS receiver 18, and control processor 22 cooperate to provide an efficient use of battery power to maintain the freshness of short-term and long-term information, while conserving battery energy for primary telecommunication functions. To this end, control processor 22 is connected to the wireless communication transceiver 16 and the GPS receiver 18. Control processor 22 is configured to periodically actuate the GPS receiver 18 to update GPS information. Control processor 22 connects battery 50 to GPS receiver 18 by closing switch 40, orders GPS receiver 18 to acquire short term or long term data and then disconnects battery 50 by opening switch 40.

Control processor 22 is further responsive to operating conditions of the wireless telephone 10 to affect the GPS data maintenance schedule by lengthening the schedule, delaying an individual measurement, or, conversely, obtaining information immediately. Further, obtaining information is also delayed when it is relatively certain that either the position of the wireless telephone is not changing or that the wireless telephone is not in an advantageous condition for signal reception. Thus, precious energy is conserved during times when GPS information updates are either unnecessary or improbable.

Advantageously, when the wireless communication transceiver 16 receives a paging message from the satellite communication system 14 indicating an incoming call, the control processor 22 causes the GPS receiver 18 to acquire new PVT data (short term information). Further, when the user presses a key on the keypad 28, the control processor 22 causes the GPS receiver 18 to acquire new PVT data (short term information). In this manner, when the wireless telephone 10 is about to make or receive a call or initiate some geo-location feature, the GPS receiver 18 anticipates and executes a fresh short-term information update.

Furthermore, wireless telephone 10 may be configured to alter the information maintenance schedule in relation to signal strength measurements made by the wireless communication transceiver 16 of a signal from the communications satellite 14. If the signal strength drops below a predetermined threshold, then it is unlikely that the GPS receiver will be able to perform the intended maintenance actions in a timely fashion. Therefore, the time between data updates is lengthened. Further, if the signal strength falls below a predetermined threshold while the GPS receiver 18 is obtaining long term information (i.e., almanac information), then control processor 22 causes GPS receiver 18 to stop making measurements and opens switch 40 to disconnect GPS receiver 18 from battery 50.

On the other hand, when the signal strength increases above a predetermined threshold, it is probable that the user is about to place a telephone call or initiate some geolocation feature. Alternatively, the wireless telephone may have been moved into an area of good signal reception where information may be acquired quickly. In either case, it is advantageous that the GPS receiver obtain fresh information and therefore the control processor 22 will close switch 40 and order GPS receiver 18 to immediately obtain information responsive to an signal strength increase above the threshold.

It is further advantageous that control processor 22 observes differences between recent PVT measurements to determine rate of motion of the wireless telephone. If the wireless telephone is stationary or moving slowly, then the period between data acquisitions may be lengthened. Alternately, if the wireless telephone 10 is moving rapidly, then it is likely that the PVT data needs to be updated more frequently, in which case the period may be shortened.

Figure 2:
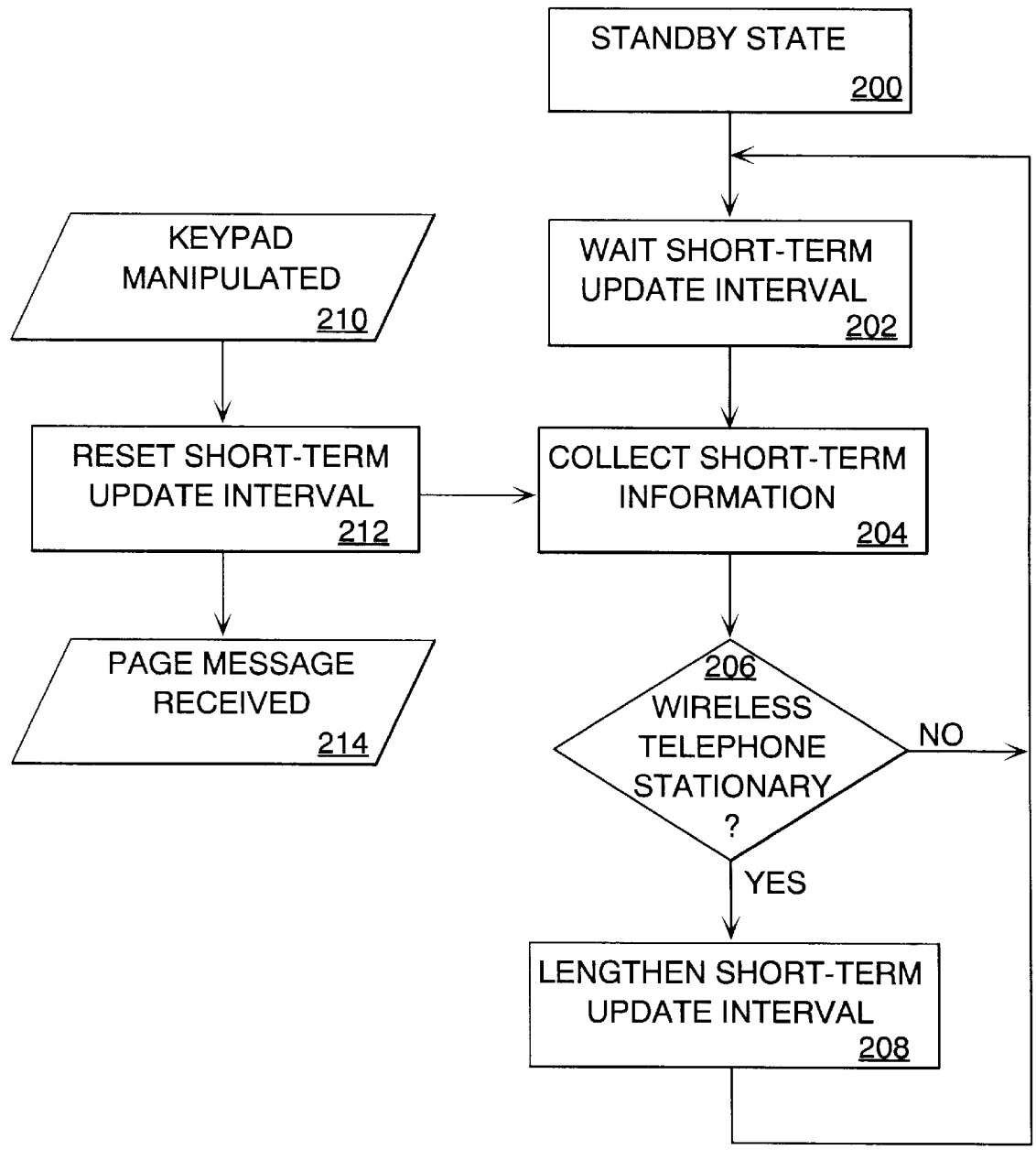
FIGS. 2 and 3 are flowcharts illustrating adaptive short-term information collection according to exemplary method of this invention.

A flowchart of an exemplary method for altering the schedule of short-term information collection in response to events is shown in FIG. 2. Processing starts in box 200 wherein the wireless telephone 10 is in a standby state with the wireless telephone 10 on but not currently engaged in communication traffic. At box 202, the wireless telephone waits some update interval before proceeding to box 204. At box 204, the GPS receiver 18 collects short-term information.

At decision diamond 206, a determination is made if wireless telephone 10 is stationary. This determination is made by selecting previous PVT values and comparing them. If there is no change of position, then the short-term information collection interval of box 202 is lengthened in box 208, and processing loops back to box 202. Note that some sort of maximum update interval may be imposed upon box 208. If motion is observed at decision diamond 206, however, processing loops directly back to box 202, and the update interval is unchanged.

If at any time the user manipulates the keypad in any way, the update cycle is interrupted and box 210 is immediately entered. Box 210 proceeds to box 212 where the short-term collection interval is reset to some nominal length. This reset action leads directly to box 204 where short-term information is collected immediately in anticipation of a user-demanded call or other service requiring a prompt and accurate position fix. The process then resumes at box 206 as discussed in the above section.

Likewise, if at any time the communications network initiates a paging message to the wireless telephone, the normal update cycle is interrupted and box 214 is immediately entered. Box 214 proceeds to box 212 where the short-term collection interval is reset to some nominal length. This reset action leads directly to box 204 where short-term information is collected immediately in anticipation of a user-demanded call or other service requiring a prompt and accurate position fix. The process then resumes at box 206 as discussed in the above section.

Figure 3:
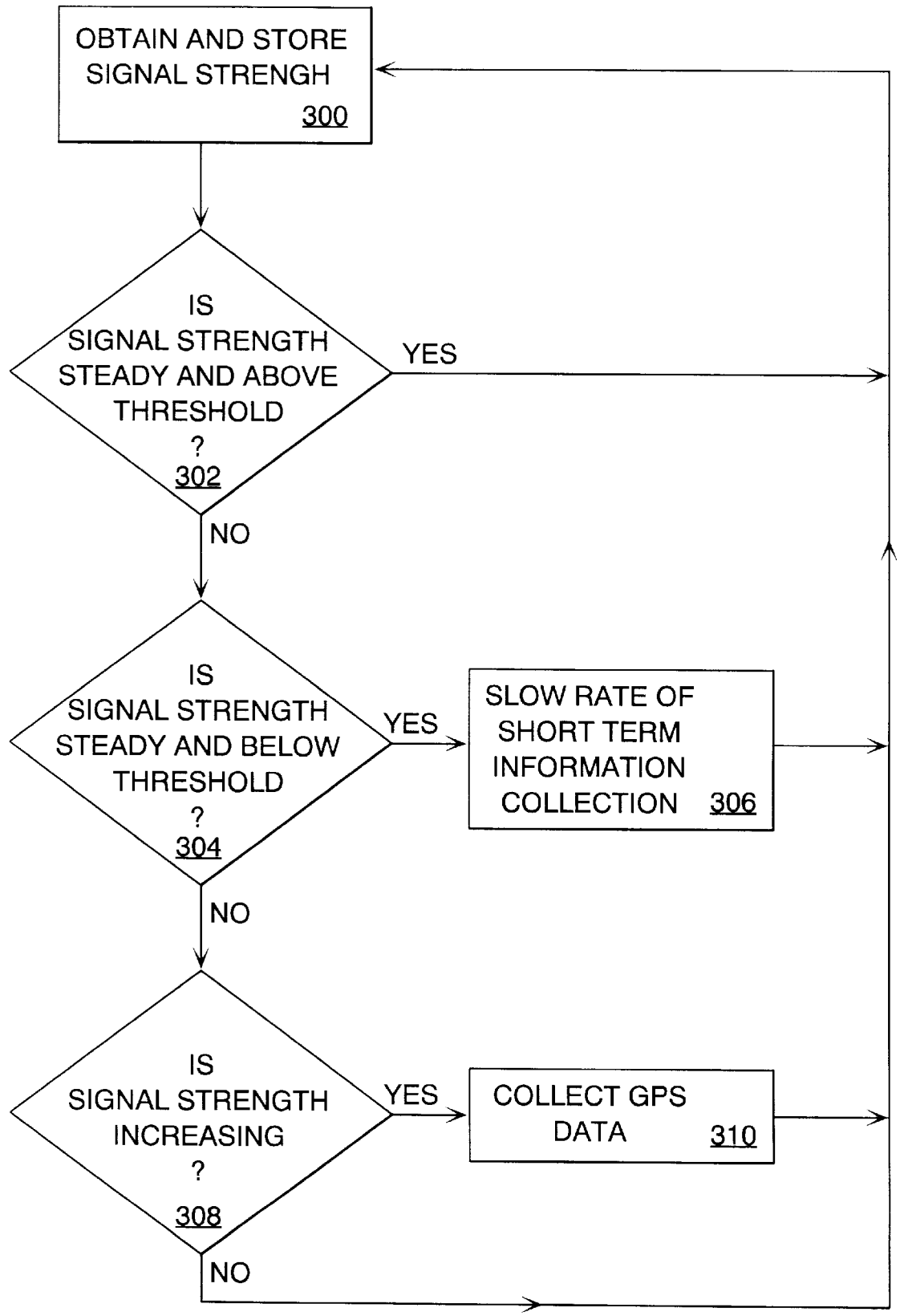

Turning now to FIG. 3, a flow chart illustrating short-term data gathering in relation to signal strength events is shown. Processing starts in box 300, where the signal strength is collected and stored by wireless communication transceiver 16. Processing continues to decision diamond 302 where a determination is made whether the signal strength is steady and above a threshold. If it is, then processing loops back to box 300, and the normal schedule is maintained.

If, in decision diamond 302, the signal strength is not steady or above the threshold, then processing continues to decision diamond 304, where a determination is made whether the signal strength is steady and below a threshold. If the signal strength is steady and below a threshold, then the probability that a short-term information collection either would not be successful or would take a prohibitively long period of time. Therefore, processing continues to box 306, where the rate of short-term information collection is slowed. Processing then loops back to box 300.

If, in decision diamond 304, the signal strength is not steady or below the threshold, then processing proceeds to decision diamond 308, where a determination is made whether the signal strength is increasing. If the signal strength is increasing, then short-term information is collected immediately. Such a signal strength increase can indicate that the telephone is being prepared for a user's call. If the signal strength is not increasing, then processing loops back to box 300, and the usual schedule is maintained.

Figure 4:
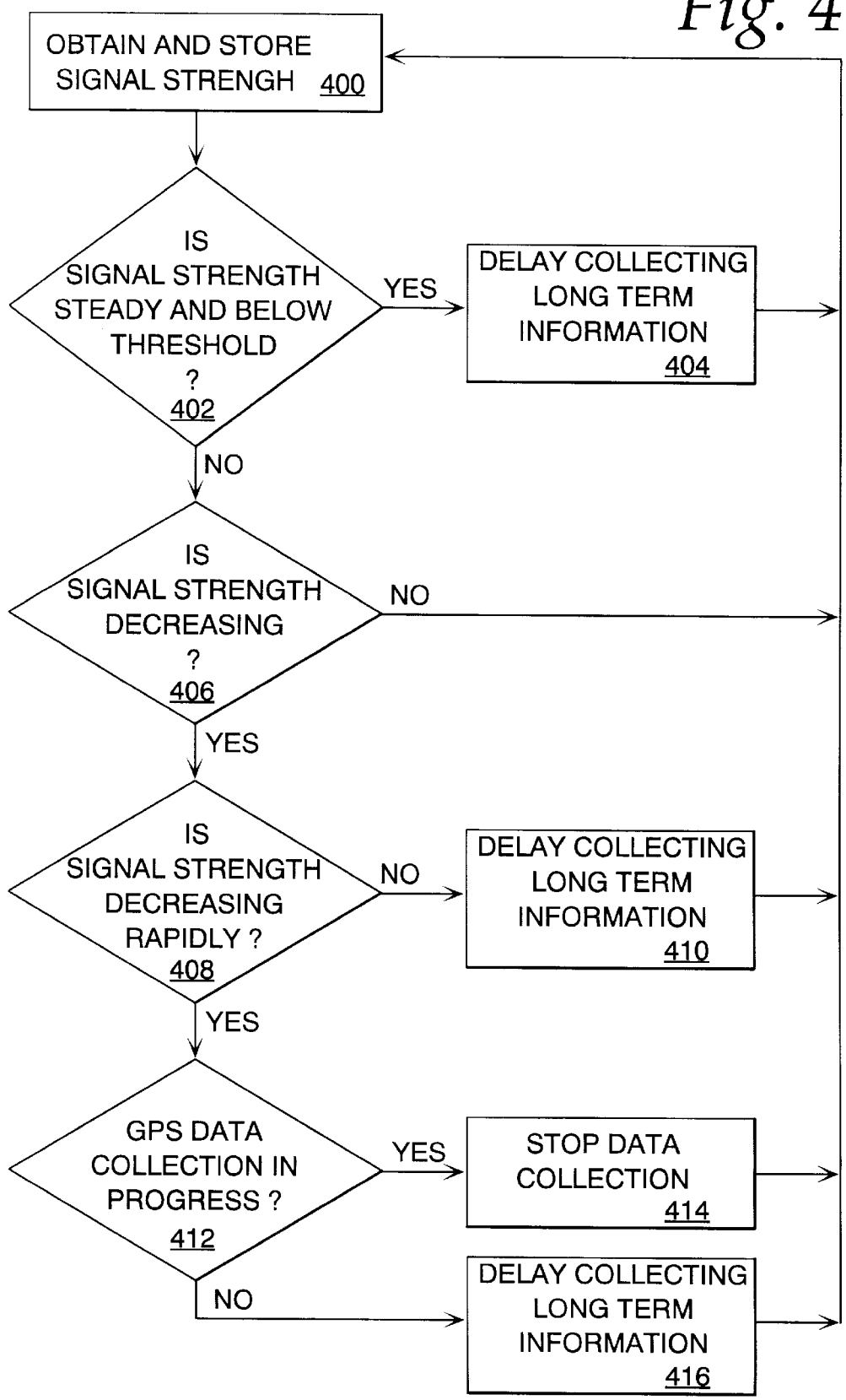
FIG. 4 is a flowchart illustrating adaptive long-term information collection according to an exemplary method of this invention.

Turning to FIG. 4, a flowchart illustrating signal strength measurements affecting long-term data collection is shown. Processing starts in box 400, where a signal strength measurement is obtained and stored by wireless communication transceiver 16. Processing proceeds to decision diamond 402, where a determination is made whether the signal strength is steady and below a threshold. If it is, then processing proceeds to action box 404 where collection of long-term information is delayed. This collection activity is delayed due to the low probability of success indicated by the signal strength value associated with the communications network. Processing then loops back to box 400.

If, in decision diamond 402, the signal strength is changing or above the threshold, then processing moves to decision diamond 406, where a determination is made whether the signal strength is decreasing. If the signal strength is not decreasing, then processing loops back to box 400, and the usual long term data collection period is used.

If, in decision diamond 406, the signal strength is decreasing, then processing moves to decision diamond 408, where a determination is made whether the signal strength is decreasing rapidly. If the signal strength is not decreasing rapidly, then processing proceeds to box 410, where collection of long-term information is delayed. If the signal strength is decreasing rapidly, then processing proceeds to decision diamond 412, where a determination is made whether long-term data is currently being collected. If it is, then processing proceeds to box 414, where data collection is terminated. Such a termination prevents the wireless telephone from wasting valuable energy on a data collection task whose probability of success is rapidly diminishing. If it is not, then processing moves to action box 416, where collection of long-term information is delayed. Processing loops back to box 400 from both box 414 and box 416.

It is to be understood that the above-described embodiment is to illustrate the principles of this invention, and that those skilled in the art may devise many variations without departing from the scope of this invention. It is, therefore, intended that such variations be included within the scope of the appended claims.

What is claimed is:

1. A wireless telephone for use in a wireless communications network, said wireless telephone comprising:
   a transceiver configured to establish and maintain communication with said wireless communications network;
   a global positioning system (GPS) receiver configured to acquire short term and long term information used in making position determinations; and
   a controller connected to the transceiver and the GPS receiver, said controller configured to periodically actuate the GPS receiver to acquire short term and long term information at selected time intervals and further configured to alter the time intervals of the periodic actuation of the GPS receiver and the acquisition of said short term and long term information responsive to the wireless telephone's operating conditions.

2. The wireless telephone of claim 1 wherein the controller causes the GPS receiver to immediately acquire short term information responsive to the transceiver's receipt of the paging message.

3. The wireless telephone of claim 1 wherein said wireless telephone further includes a keypad connected to the controller and wherein the controller causes the GPS receiver to immediately acquire short term information responsive to general keypad manipulation.

4. The wireless telephone of claim 1 wherein said transceiver is adapted to make signal strength measurements of a predefined signal from the wireless network, and wherein said controller is further configured to affect acquisition of said short term and long term information responsive to the signal strength measurements.

5. The wireless telephone of claim 4 wherein said controller is configured to actuate the GPS receiver to immediately obtain short-term information responsive to the signal strength increasing.

6. The wireless telephone of claim 4 wherein said controller is configured to skip at least one of said periodic acquisitions of short term information responsive to the signal strength measurements being below a threshold.

7. The wireless telephone of claim 4 wherein said controller is configured to skip at least one of said periodic acquisitions of short-term information responsive to the signal strength measurements decreasing.

8. The wireless telephone of claim 4 wherein said controller is configured to delay at least one of said periodic acquisitions of long term information responsive to the signal strength measurements being below a threshold.

9. The wireless telephone of claim 4 wherein said controller is configured to delay at least one of said periodic acquisitions of long term information responsive to the signal strength measurement decreasing.

10. The wireless telephone of claim 4 wherein said controller is configured to abort acquisition of long term information responsive to the measured signal strength decreasing rapidly.

11. The wireless telephone of claim 1 wherein said controller is adapted to determine motion of said wireless telephone by comparing short term information and wherein the period of acquisition of short term information is lengthened if the wireless telephone is stationary.

12. The wireless telephone of claim 1 wherein said controller is adapted to determine motion of said wireless telephone by comparing short term information and wherein the period of acquisition of short term information is shortened if the wireless telephone is moving.

13. In a wireless telephone powered by a battery and having a wireless communication transceiver responsive to a plurality of events for establishing and maintaining communication and a global positioning system (GPS) receiver that obtains short term and long term information for position calculations based in part on the short term and long term information, said GPS receiver having an "on" state where it draws battery power and an "off" state where it does not draw battery power, a method for preserving battery energy when said wireless telephone is in a standby mode while maintaining short term and long term information for making a prompt and accurate position determination, said method comprising:

acquiring short term information at selected time intervals by:
(a) changing said GPS receiver to said "on" state;
(b) obtaining a set of short-term information measurements;
(c) changing said GPS receiver to said "off" state;
(d) repeating steps (a) through (c) at the selected time intervals; and altering time intervals based on events in the wireless telephone.

14. The method of claim 13 wherein the short-term information is immediately acquired responsive to receipt of a paging message at said wireless communication transceiver.

15. The method of claim 13 wherein the wireless telephone includes a keypad, and wherein one of the events comprises receipt of a paging message at said wireless communication transceiver; wherein the short term information is immediately acquired responsive to general keypad manipulation.

16. The method of claim 13 wherein the wireless communication transceiver makes signal strength measurements of a signal from the wireless network, and wherein short term information is immediately acquired responsive to an increase in the signal strength.

17. The method of claim 13 wherein the wireless communication transceiver makes signal strength measurements of a signal from the wireless network, and wherein short term information is acquired less frequently responsive to a decrease in the signal strength.

18. The method of claim 13 wherein the wireless communication transceiver makes signal strength measurements of a signal from the wireless network, and wherein short term information is acquired less frequently responsive to the signal strength remaining below a threshold.

19. The method of claim 13 further including comparing short term information and wherein the short term information is acquired less frequently responsive to little or no change in the position of the wireless telephone.

20. The method of claim 13 further including comparing short term information and wherein the short term information is acquired more frequently responsive to change in the position of the wireless telephone.

21. In a wireless telephone powered by a battery and having a wireless communication transceiver responsive to a plurality of events for establishing and maintaining communication and a global positioning system (GPS) receiver that obtains short term and long term information for position calculations based in part on the short term and long term information, said GPS receiver having an "on" state where it draws battery power and an "off" state where it does not draw battery power, a method for preserving battery energy when said wireless telephone is in a standby mode while maintaining short term and long term information for making a rapid GPS position determination, said method comprising:

acquiring long term information at selected time intervals by:
(a) changing said GPS receiver to said "on" state;
(b) obtaining long term information;
(c) changing said GPS receiver to said "off" state;
(d) repeating steps (a) through (c) at the selected time intervals; and altering the time intervals based on events in the wireless communication transceiver.

22. The method of claim 21 wherein the wireless communication transceiver makes signal strength measurements of a signal from the wireless network, and wherein the acquisition of long term information is aborted responsive to a rapid decrease in the received signal strength indication.

23. The method of claim 21 wherein the wireless communication transceiver makes signal strength measurements of a signal from the wireless network, and wherein the acquisition of long term information is delayed responsive to a decrease in the received signal strength indication.

24. The method of claim 21 wherein the wireless communication transceiver makes signal strength measurements of a signal from the wireless network, and wherein the acquisition of long term information is delayed responsive to the received signal strength indication remaining below a threshold.

* * * * *